Aug. 7, 1956
G. S. DUNCAN ET AL
2,757,425
APPARATUS AND PROCEDURE FOR TREATMENT OF MOLTEN ALUMINUM
Filed Nov. 18, 1952
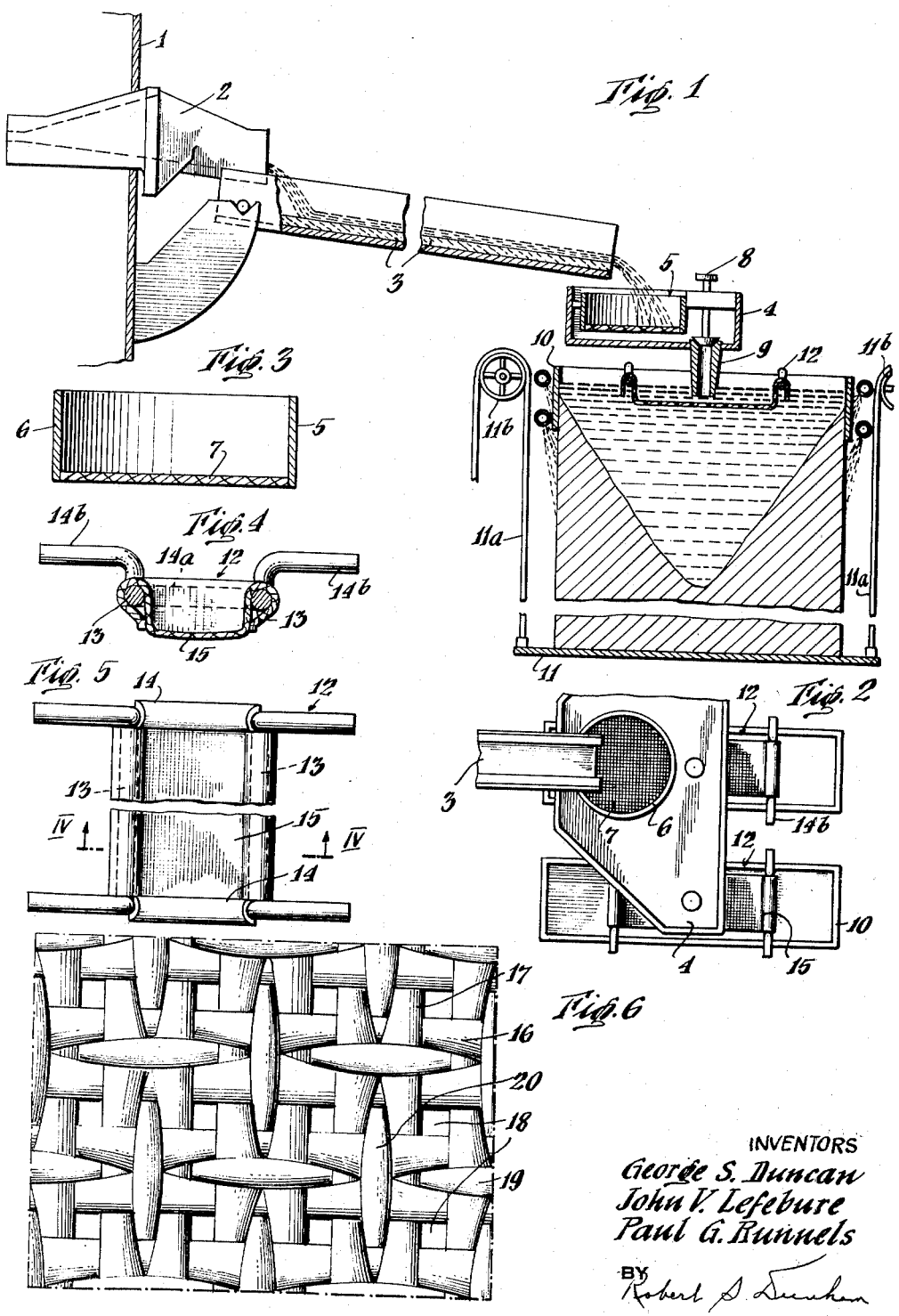
INVENTORS
George S. Duncan
John V. Lefebure
Paul G. Runnels
BY
Robert S. Dunham
ATTORNEY

United States Patent Office 2,757,425
Patented Aug. 7, 1956

2,757,425
APPARATUS AND PROCEDURE FOR TREATMENT OF MOLTEN ALUMINUM

George S. Duncan, Kingston, Ontario, John V. Lefebure, Point Claire, Quebec, and Paul G. Runnels, Kingston, Ontario, Canada, assignors to Aluminium Laboratories Limited, Montreal, Quebec, Canada, a corporation of Canada Application November 18, 1952, Serial No. 321,232

5 Claims. (Cl. 22—57.2)

This invention relates to apparatus and procedure for the treatment of molten aluminum, as in pouring operations or the like, and is particularly directed to screening or filtration of the molten metal, for example when it is being cast into ingot designed for various methods of working or shaping.

A particularly important aspect of the invention is concerned with improvement in certain means or steps of the so-called continuous casting process. In such process an ingot or like body is produced by delivering molten aluminum to the head of a mold as the thus cast body is progressively withdrawn from the bottom, the metal being correspondingly continuously solidified while it passes down through and out of the mold and while coolant is applied both to the mold wall and directly to the discharging body. In the casting of aluminum, e. g. by the method just described, it has been desirable to filter the molten metal, for example as it passes from the melting or alloying furnace to the molds. Thus for continuous casting it is common to pass the molten metal through a heavy wire screen located in the path of the aluminum as it pours from a feed trough into a distributing basin for a group of molds.

In the continuous casting process, the aluminum is commonly delivered to the head of the mold through a conduit called a dip tube, whose discharge end is normally below the surface of the aluminum in the mold. The molten aluminum flows through the dip tube at a velocity which is high in comparison to the downward speed of the forming ingot. In order to minimize the turbulence in the inpot-forming body of aluminum which might be produced by this high velocity stream, it is common to place in the mold below the dip tube a baffle structure, usually a horizontal plate with suitable apertures formed in it for the passage of aluminum, the apertures being out of alignment with the end of the dip tube so that the downward velocity of the stream is slowed. This baffle is sometimes provided with a rim which projects upwardly above the surface of the metal in the mold. The combined baffle and rim structure is sometimes termed a skim pan. While the skim pan has a certain inherent filtering function, especially for impurities of lower density than aluminum, the primary functions of the baffle plate are to retard the downward velocity of the aluminum entering the mold and to distribute the downward flow of molten aluminum across the mold. The apertures in the baffle plate are commonly much larger than those in the preceding screen, so that the baffle can have no filtering action in the sense of withholding solid foreign bodies from the stream of flowing aluminum, as long as the screen is effective.

Both of these structures, viz the screen at the entrance of the distributor basin and the skim pan, are required to resist the physical and chemical action of molten aluminum at temperatures of the order of 675° to 700° C. or so. Thus the skim pan, which is usually below the surface of metal in the mold until the metal drops down at the end of the pour (i. e. when an ingot of desired length has been cast), is ordinarily a heavy plate-like device of iron or steel. For example, one conventional skim pan is made of cast iron, 3½ inches deep, and having, over a bottom area of 16 inches by 4 inches, a set of seven holes each ⅜ inch in diameter, for distributing the metal in the mold; the number and size of holes may vary with the horizontal size of the pan, which depends on the horizontal dimensions of the mold.

For removing solid foreign bodies from the molten aluminum, the filter in the distributor basin of the casting apparatus is customarily a heavy wire screen. For example, one conventional filter screen employed in such locality has been constructed of heavy steel wire of 0.063 inch diameter, with an 8 x 8 mesh (eight openings per linear inch). Although defects in the finished ingots or especially defects in the sheet or other ultimate product, such as blisters or air holes, and foreign inclusions, may have indicated that the filters were not sufficiently fine and were allowing too many impurities to pass through them, nevertheless light iron or steel filters with fine mesh screens have appeared useless because of rapid deterioration of the filter material. Indeed since aluminum attacks and dissolves steel or iron, all such structures must be given a coating of refractory material, commonly whitewash, or whiting ($CaCO_3$) before each use. The need for a protective coating has further limited the minimum usable size of filter opening, since the whitewash, customarily made of lime, or whiting, with a sodium silicate binder, tends to clog small openings badly.

Pursuant to the present invention it has now been discovered that considerable improvement in the quality of the ultimate metal can be achieved by utilizing glass fiber cloth as a filtering medium for molten aluminum, and also, specifically, that remarkable and especially valuable results are obtained with a glass cloth filter substituted for the skim pan structures heretofore employed in the continuous casting process. In the first-mentioned more general sense, as where glass cloth is used to filter the metal entering the distributing basin, improvement has been shown by the better quality of sheet or other product which is rolled from ingots so produced, e. g. in that a lower percentage of sheets are rejected for blisters. For such results (including reduction of the number of foreign body inclusions in the ingots) the glass cloth filter permits much finer screen openings than are practical with metal filters; not only is the glass cloth inert to chemical action by the molten aluminum, but the fine fibers are not embrittled or otherwise physically damaged by the hot metal and indeed ordinarily do not even require preheating before use.

As indicated above, a particularly important aspect of the invention is the discovery that unexpected advantages, beyond improvement due to actual filtration (i. e. better removal of foreign substances), are obtained by using a glass cloth filter instead of the conventional skim pan (or basin) in the upper end of the mold. With glass cloth at such locality, where it is more commonly not sought to obtain any substantial filtering action, the resulting ingots are more satisfactory in several respects and provide a better quality of metal products, apparently in considerable part because of better working properties in the metal. Thus it has been found that surface defects (e. g. cavities, surface irregularities and inclusion) in the ingot are materially reduced or reduced in depth, so that the average depth of scalping or trimming necessary before use of the ingots is smaller and fewer scalping cuts need be made. In sheets rolled from such ingots, blister occurrence is greatly reduced, apparently much beyond that which would be accounted for by improved filtration as described above with glass cloth in the distributor basin. Likewise with respect to ingot used for forge stock, ultrasonic tests of forgings have shown a much lower percentage of pieces with defects warranting rejection. Finally, photographic examination of etched sections of ingot cast with a glass cloth skim pan (basin) have shown a coarser grain or crystal structure of the metal, as contrasted with the grain structure in (a) ingot cast with the usual cast iron skim pan but employing a glass cloth filter in the upper (distributor basin) locality remote from the mold, and (b) ingot cast with a glass cloth filter supported in and by the conventional iron skim pan. The coarse grain structure appears to contribute materially to or at least to be indicative of the superior quality of the metal, especially after rolling, forging or other working.

From these results it is concluded that a major effect of the glass cloth skim basin is a remarkable improvement in ingot quality, caused by a more effective distribution of molten metal at the top of the mold. As the aluminum flows into the mold (usually to a level above the bottom of the skim pan) and then down through the glass fiber cloth, it is very uniformly distributed, traversing the cloth in a great multiplicity of paths at all localities across the mold. Large turbulences are quieted and there is no splashing or entrapment of air or gas as the metal reaches the mold walls. Since the metal there tends to freeze quite promptly, any non-uniformity of metal flow to the walls, such as occurs in conventional structures, tends to allow some portions to solidify too soon, producing imperfections. Similarly turbulence and non-uniformity within the forming ingot body may lead to blisters, imperfectly coherent regions or fine grain solidification. It appears that optimum conditions now found to be reached or approached with the use of glass cloth, are attained where the molten aluminum is spread uniformly and with uniform temperature across the mold, and travels quietly downward with an even temperature gradient (or an even flow of heat) outward from the center to the mold wall and to the frozen exterior of the body below the mold.

For the purposes of the invention it has been found that a woven glass cloth is effective, especially more so than knitted or other fabrics which, unless supported, sag excessively and stretch unevenly to yield a region of unduly large apertures. In presently preferred forms of the filters, a glass cloth has been used having a so-called mock leno weave, with holes approximately 0.01 inch square. Indeed a special feature of the invention is the use of a weave of this character, having formed openings and an interlock of the threads defining the openings. For various requirements other weaves and hole sizes may be used, but weaves of the sort just mentioned are preferred.

Other objects and advantages of the invention will become apparent from a consideration of the following description of certain embodiments, taken in connection with the accompanying drawings. In the drawings, Fig. 1 is a cross-sectional view of aluminum casting apparatus including filters constructed in accordance with the present invention, conventional parts being simplified;

Fig. 2 is a fragmentary plan view, showing a portion of the apparatus of Fig. 1;

Fig. 3 is an enlarged sectional view of one form of filter screen which may be used in the apparatus of Fig. 1;

Fig. 4 is a sectional view on the line IV—IV of Fig. 5 of a skim pan constructed in accordance with the invention;

Fig. 5 is a plan view of the skim pan of Fig. 4; and,

Fig. 6 is a plan view of a piece of glass cloth having a mock leno weave.

The term "filter" as used in this specification is intended to be a generic term inclusive of filter screens for use in distributor basins, such as that shown in Fig. 3, and filter structures used as skim pans in casting molds, such as that shown in Figs. 4 and 5.

Referring to the drawings, there is shown in Fig. 1 a portion of the wall 1 of an aluminum melting furnace. The furnace is provided with a tapping spout 2 from which aluminum may flow through a suitable trough 3 into a distributor basin 4. Supported in the distributor basin adjacent and under the end of trough 3 is a filter generally indicated at 5. The filter 5 is shown in detail in Fig. 3 and includes a cylindrical steel frame 6, and a sheet 7 of glass cloth stretched across the bottom of the frame 6.

Aluminum flows from the distributor basin 4 through valves 8 of conventional form, shown somewhat diagrammatically, and leading into dip tubes 9 which convey the aluminum into continuous casting molds 10.

In the continuous casting process, the mold 10 is provided with a vertically movable bottom 11, shown simply as supported by cables 11a which pass over pulleys 11b. When the casting of an ingot is started, the bottom 11 closes the lower end of the mold 10. Molten aluminum is poured into the mold 10 through the dip tube 9 until the level rises enough to cover the end of the dip tube. At the same time, and throughout the casting process, cooling water is sprayed over the outer surface of the mold so as to freeze and solidify the outer parts of the ingot. As soon as the level of metal inside the mold has risen above the end of the dip tube, the bottom 11 is driven downwardly by a suitable motor (not shown) at a rate of speed appropriate for the particular alloy and ingot size being cast and the rate of flow of molten metal through the dip tube is adjusted so as to maintain the level of metal inside the mold 10. The outer parts of the ingot are solidified by the time they pass the lower edge of the mold 10, and are effective to retain the molten inner parts of the ingot in place. The outer surface of the mold 10 and the ingot surface below the mold are cooled by water sprays. The rate of movement of the bottom 11 and the rate of flow of aluminum into the mold 10 must be coordinated with the rate of "freeezing" or solidification of the metal inside of the mold, so that the outer parts of the ingot will always be frozen before they pass the lower edge of the mold 10. The rate of downward travel of the bottom 11 and the ingot it very slow, e. g., it is common to use rates in the neighborhood of 4 to 6 inches per minute. The process continues until an ingot of desired length is produced, whereupon the flow of molten aluminum is stopped.

The aluminum entering the mold passes into a skim pan 12, shown in detail in Figs. 4 and 5. In the form illustrated, the skim pan has a framework formed of two longitudinal bars 3 and two cross-bars 14. As best seen in Fig. 4, the cross-bars 14 have a central downwardly depending U-shaped section 14a and projecting ends 14b, by which the skim pan is supported on the sides of the mold. The longitudinal bars 13 are attached to the cross-bars 14 near the sides of the U-shaped section 14a. A sheet of glass cloth is attached to the frame members 13, 14 and has its central portion depending downwardly to form a filter basket 15. The sheet may be fastened by stapling its outer overhanging edges to the downwardly depending central portion. The U-shaped sections 14a of the cross-bars 14 are sufficiently deep so that the glass cloth basket 15 is normally submerged in the molten aluminum below the discharge end of the dip tube 9. The size of the filter basket 15 may be large enough so that it covers the whole top of the mold. Its minimum size is determined by the size required to get the desired rate of flow through the cloth. In practice, it is never less than about 50% of the area of the mold top, but there is no critical minimum limit.

Many conventional forms of glass cloth may be successfully used, either for the screen 7 of the filter 5 or for the basket 15 of the skim pan 12, as long as the fabric is open, i. e., as long as it has a regular array of holes. For example, a simple knit fabric formed of single strand threads has been used with modest success, in some cases. It has been found, however, that the filter structure will have a longer life if a more rugged fabric is employed. The threads of the fabric should be interlocked to guard against relative shifting movements of the threads. It is presently preferred to use woven cloth with a mock leno weave. This is a conventional type of weave, and is illustrated in Fig. 6. As there shown, it may be seen that this weave consists of a first network of horizontal threads 16 and vertical threads 17, which define between them an evenly spaced array of holes 18. Woven through this first network is a second network of horizontal threads 19 and vertical threads 20, which lie respectively between the threads 16 and 17. The threads 19 and 20 serve as reinforcing threads for the fabric, and also lock the threads 16 and 17 against lateral movement. Such a weave produces a structure which resists distortion with continued use which may be encountered where fabrics formed of separate single non-interlocked strands are employed.

Other open weaves wherein the threads defining the holes are locked against lateral movement may be employed. For example, a conventional leno weave may be employed, using only one network of threads and having adjacent cross threads interlocked with each other.

It is presently preferred to use a glass cloth filter in which the holes are substantially square and have dimensions of the order of .01 in.

It has been found that filters of the type described herein produce a substantially improved product, in that a greater percentage of the inclusions are removed from the aluminum by the filters, and substantially smaller proportion of the product is rejected due to imperfections such as blisters, microporosity and non-metallic inclusions.

It is common to "scalp" or remove the outer layers of the ingots of aluminum before rolling them, in order to get a satisfactory rolling surface, since most of the defects are found in those outer layers. It has been found that when glass cloth filters are used, the number of defects is reduced and that they are confined to a much thinner outer layer so that it is possible to reduce substantially the thickness of the "scalp."

It has also been found that the glass cloth skim pans have an improved distributing action as compared to the distributing action of the conventional pans. The molten aluminum flows more evenly to all parts of the ingot, so that there is considerably less turbulence in the unfrozen aluminum within the ingot. The temperature gradient within the ingot therefore is believed to be smoother and less subject to unpredictable variations, so that the freezing process presumably takes place without objectionable changes in temperature or in the relative positions of adjacent particles. The resulting ingot structure is found to be more homogeneous, with fewer imperfections and with a larger grain size. Because of the better ingot structure, the forms, such as plates, sheets, etc., made from the ingots are of better quality. The fact that some of the holes in the glass cloth sheet are necessarily aligned with the dip tube does not interfere with the function of the sheet as a baffle, because the holes in the sheet are so small.

While the apparatus illustrated includes two glass cloth filters, namely the screen 7 in the filter 5 and the basket 15 in the skim pan 12, it should be understood that apparatus using only one such filter is within the scope of the invention. If glass cloth is used only in the filter 5, many of the advantages of improved filtering action will be secured, even though a skim pan structure of the prior art is employed. If glass cloth is used only in the skim pan 12, substantially all the benefits of the invention will be secured, including improved filtering action and improved grain structure in the ingot. These benefits will be secured even though a filter 5 is used having a screen constructed in accordance with the prior art, or even though no filter is used ahead of the skim pan.

The term "aluminum" is used herein as a generic term including commercial alloys in which aluminum is the principal component.

While we have shown and described certain preferred embodiments of our invention, other modifications thereof will readily occur to those skilled in the art, and we, therefore, intend our invention to be limited only by the appending claims.

We claim:

1. Apparatus for continuously casting aluminum comprising a mold, a downwardly movable bottom for said mold, means including a dip tube for directing a flow of molten aluminum downwardly into the mold, said dip tube having its lower end projecting below the surface of the molten aluminum in the mold, means for cooling the mold periphery to solidify the outer parts of the metal therein, means for moving said bottom downwardly at a rate proportional to the rate of flow of molten aluminum, and only a single glass cloth filter having an open weave cloth and extending horizontally in the mold below said dip tube, said sheet being effective to distribute the entering aluminum horizontally through the mold cross-section, and to direct the downward flow of aluminum in the mold through a multiplicity of parallel paths of small cross-section defined by the holes in said cloth sheet.

2. Apparatus for casting aluminum comprising an aluminum melting furnace, a trough to convey molten aluminum from said furnace, a basin to receive molten aluminum from said trough, an ingot mold to receive molten aluminum from said basin so constructed and arranged as to contain a molten bath of aluminum and only a single glass cloth filter positionable in said molten bath in the path of aluminum pouring into the bath directly under said basin from said basin.

3. A method of casting aluminum which comprises transferring molten aluminum from a furnace to a mold while passing the molten aluminum through only a horizontally extending glass cloth filter positioned in the mold in the downward path of molten aluminum flowing into said mold.

4. A method of casting aluminum which comprises transferring molten aluminum from a furnace to a mold while passing the molten aluminum into said mold in a continuous flow through only a glass cloth filter submerged in the molten aluminum and positioned horizontally in the mold.

5. Apparatus for casting aluminum as claimed in claim 2, having an aluminum distribution member composed essentially of glass cloth, said glass cloth having holes approximately .01 of an inch square, said mold having a substantial bath of molten metal beneath said aluminum distribution member and receiving a flow of aluminum from said deflecting member.

References Cited in the file of this patent

UNITED STATES PATENTS

| | | |
|---|---|---|
| 1,304,623 | Sullivan et al. | May 27, 1919 |
| 1,710,398 | Bakken | Apr. 23, 1929 |
| 1,862,787 | Ennor | June 14, 1932 |
| 1,915,004 | Schmeller | June 20, 1933 |
| 1,983,579 | Ennor et al. | Dec. 11, 1934 |
| 2,301,027 | Ennor | Nov. 3, 1942 |
| 2,450,047 | Kloeckener | Sept. 28, 1948 |
| 2,451,505 | Myskowski et al. | Oct. 19, 1948 |
| 2,461,112 | Foster | Feb. 8, 1949 |

FOREIGN PATENTS

| | | |
|---|---|---|
| 406,085 | Great Britain | Feb. 22, 1934 |
| 721,537 | Germany | June 8, 1942 |